(12) United States Patent
Wang et al.

(10) Patent No.: US 6,817,510 B2
(45) Date of Patent: Nov. 16, 2004

(54) APPARATUS FOR INCREASING WAVE HEIGHT OF MOLTEN SOLDER IN SOLDER BATH

(75) Inventors: Po-Hung Wang, Taipei Hsien (TW); Yo-Chang Chen, Tainan (TW)

(73) Assignee: ASUSTeK Computer Inc., Taipei (TW)

( * ) Notice: Subject to any disclaimer, the term of this patent is extended or adjusted under 35 U.S.C. 154(b) by 85 days.

(21) Appl. No.: 10/260,391

(22) Filed: Oct. 1, 2002

(65) Prior Publication Data

US 2003/0075585 A1 Apr. 24, 2003

(30) Foreign Application Priority Data

Oct. 24, 2001 (TW) ........................................ 90218190 U

(51) Int. Cl.$^7$ .............................................. B23K 37/00
(52) U.S. Cl. ........................................ 228/37; 228/260
(58) Field of Search ........................... 228/260, 37, 56.1

(56) References Cited

U.S. PATENT DOCUMENTS

| | | | | |
|---|---|---|---|---|
| 4,568,016 A | * | 2/1986 | Payne ..................... | 228/180.1 |
| 4,632,291 A | * | 12/1986 | Rahn et al. .................... | 228/9 |
| 4,666,077 A | * | 5/1987 | Rahn et al. .................... | 228/37 |
| 4,848,640 A | * | 7/1989 | Gieskes ....................... | 228/37 |
| 4,886,201 A | * | 12/1989 | Deambrosio et al. ......... | 228/37 |
| 4,981,249 A | * | 1/1991 | Kawashima et al. .......... | 228/37 |
| 5,203,489 A | * | 4/1993 | Gileta et al. ................ | 228/219 |
| 5,794,837 A | * | 8/1998 | Cottingham et al. .......... | 228/37 |
| 6,431,431 B2 | * | 8/2002 | Willis et al. .................. | 228/37 |
| 6,510,978 B1 | * | 1/2003 | Koshi et al. ................ | 228/256 |
| 6,655,574 B2 | * | 12/2003 | Schouten et al. ............. | 228/37 |
| 2001/0030220 A1 | * | 10/2001 | Willis et al. .................. | 228/37 |
| 2003/0075585 A1 | * | 4/2003 | Wang et al. .................. | 228/37 |

OTHER PUBLICATIONS

Derwent–Acc–No: 1989–364522.*

* cited by examiner

Primary Examiner—Kiley Stoner
(74) Attorney, Agent, or Firm—Birch, Stewart, Kolasch & Birch, LLP

(57) ABSTRACT

The present invention discloses an apparatus applied to the wave former of the wave soldering system to increase the wave height of molten solder. The apparatus comprises a block board and a gland, wherein the block board is mounted on the enclosing walls of the wave former to increase the total height of enclosing walls thereof for increasing the wave height, and the gland is disposed on the partial opening of the wave former to press the molten solder for have higher solder wave on other partial opening of the wave former uncovered by the gland.

17 Claims, 2 Drawing Sheets

APPARATUS FOR INCREASING WAVE HEIGHT OF MOLTEN SOLDER IN SOLDER BATH

FIELD OF THE INVENTION

The present invention relates to a solder bath of wave soldering systems, and more specifically, to an apparatus applied to the wave former for increasing the wave height of molten solder.

BACKGROUND OF THE INVENTION

With the continuing advances and developments of electrical manufactures, the electrical products in new generation have more developed and complicated capability to provide peoples more convenient and comfortable life. For instance, in computer industry, because the manufacture and packaging techniques of integrated circuits are promoted and matured, the high quality multimedia personal computers are widely used. The expenditure enhancement for computers and peripheral products cause the popularization and more vigorous development thereof. However, when the performances of chips are promoted, the amounts of leads to package components on the printed circuit boards (PCBs) also are continuously enhanced. Thus the layout of printed circuit boards becomes more fine and complex. And the difficulties to mount and solder components thereon are also enhanced.

In general, the key factor of the yields of mounting assembly parts onto printed circuit boards is the leads soldering procedure of components. Especially when the amounts of leads for packaging are increased and the arrangement thereof become highly concentrated, the effective reductions of defects such as bridge, dewetting, blow hole, and etc. can promote the yields of PCBs productions and reduce the failure opportunities of components. In prior art the wave soldering procedures are mainly applied to assembly printed circuit boards for furthering mass productions. And in wave soldering process, the molten solder is driven by a motor pump and forced upward into the through holes beneath the printed circuit boards which are transported obliquely to pass the soldering wave.

Please refer to FIG. 1, the current wave soldering system 10 is illustrated. In the wave soldering system 10, a solder bath 12 is applied to contain molten solder, and a motor pump 14 mounted beside the solder bath 12 can rotate its fan blades to drive the molten solder. The molten solder gushed upwards from a wave former 16 disposed in the solder bath 12 forms the rising solder wave. And printed circuit boards 20 can be transferred above the solder bath 12 through inclined transport rails 18. Thus the rising solder wave can fill into the through holes beneath the printed circuit boards to solder the leads of components. It is noted that in the wave soldering procedure the printed circuit board 20 is disposed onto a carrier formed of aluminum alloy or fiberglass wherein the carrier has some hollows for exposing the soldering areas of the printed circuit board. Then the finger 22 chained beneath the transport rails 18 can grab two side of the carrier to transfer the printed circuit board 20 via the transport rails 18.

In general, the printed circuit board 20 is coated flux and preheated first in the front part 24 of the transport rails 18. The flux is applied to clean the surfaces of the soldering metal and to avoid rustiness in atmosphere at high temperature. Besides, the flux is also applied to spread thermal energy uniformly for enhancing the performance of the soldering points. The typical flux coating procedures include foaming type, spraying type, and soaking type. As to the subsequent preheat procedure is applied to dispel the volatility parts of the flux for promoting the temperatures of the printed circuit boards to enhance the flux activity and to prove the capability of filling molten solder into through holes. The typical preheating procedure is to apply infrared tubes beneath the carriers to illuminate the printed circuit boards for getting the predetermined temperature.

Please refer to FIG. 2, the lateral view of the solder bath 12 in wave soldering procedure is shown. The molten solder gushed upwards from the wave former 16 reflows downward along the sidewalls of the solder bath 12, and then is retrieved in the recycled trough around the solder bath 12. As to the carrier 26 containing the printed circuit board 20 can pass the solder wave of molten solder 24 via the inclined transport rails. Thus the molten solder can fill the through holes beneath the printed circuit board 20 to form solder points.

It is noted that in the typical wave soldering system the height of solder wave can not exceed 12 mm, so when this type of system is applied to soldering the printed circuit board with components mounted on both sides thereof, the rising molten solder is incapable of full filling the through holes of the printed circuit boards. Especially this type of printed circuit board 20 with components both sides usually has a large thickness, so the through holes formed therein also have large depths. And relatively, the carrier 26 applied to contain this type of printed circuit board 20 also has a large depth to effective protect the components thereon.

Therefore the yields of wave soldering procedures will be reduced amplitudely. Especially when the component 21 mounted on the first side of the printed circuit board 20 has a large height, the total height of the component 21 and carrier 26 is too large to effective fill the through hole from the second side of the printed circuit board 20. Thus the defects such as voids and broken circuits usually occur at the soldering points.

In prior art the rotation rate of the motor is increased to have higher soldering wave for the thick printed circuit board in wave soldering procedure. However in practical manufacturing process, the motor pump operated at high rotation rate is unstable and usually make turbulence in the molten solder. Thus the yield of wave soldering is becoming unstable. For solving this issue, the soldering furnace 30 as shown in FIG. 3 is introduced to soldering the thick printed circuit boards. The overflow of molten solder in solder bath 34 of the soldering furnace 30 can be controlled via adjusting the buttons on the control planet 32. The operators then put the printed circuit boards by hands on the solder bath 34 to perform the soldering procedure.

However due to the solder bath 34 is exposed out of soldering furnace 30, the air pollution is serious in soldering procedures and easy injure the operators. Beside when the numerous component leads are highly concentrated arranged, short circuits usually occur and reduce the quality of soldering points. Further, it is necessary to transfer the printed circuit board with large height out of the wave soldering production line first; and then to have the soldering procedures with soldering furnaces. Therefore the throughput is decreased and much cost and man effects are required to measure the printed circuit boards. So how to increase height of soldering wave and to keep the stability of soldering wave is a momentous issue for the integrated circuit packaging industry.

SUMMARY OF THE INVENTION

A purpose of the present invention is to provide a block board mounted onto the enclosing walls of the wave former to increase the height of enclosing walls and to make higher solder wave.

Another purpose of the present invention in to provide a gland mounted on the wave former to press the molten solder for increasing wave height of the molten solder.

Further a purpose of the present invention in to provide an apparatus applied to the wave soldering system for providing higher and stable molten solder wave.

The present invention discloses an apparatus applied to the wave soldering system for increasing wave height of molten solder. The wave soldering system comprises the following elements. A solder bath is applied to contain molten solder. A motor pump is disposed besides the solder bath having fan blades extended into the solder bath for driving the molten solders upwardly. A wave former is disposed in the solder bath to gush the molten solder upwardly to form solder wave. A block board is mounted along top edges of enclosing walls of the wave former for increasing the heights of the enclosing walls. And a gland is pressed downward along inner surfaces of the enclosing walls of the wave former to press partial molten solder and to form higher wave via the opening of the wave former uncovered by the gland.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention discloses an apparatus applied to the solder bath of wave soldering system to increase wave height of molten solder for soldering the printed circuit boards with large thickness and components mounted both sides thereof. The apparatus includes a block board disposed on enclosing walls of the wave former and a gland disposed to cover the partial opening of the wave former to press the molten solder for forming higher soldering wave. This invention will be described in further detail by way of example with reference to the accompanying drawings as follows.

Figure 4:
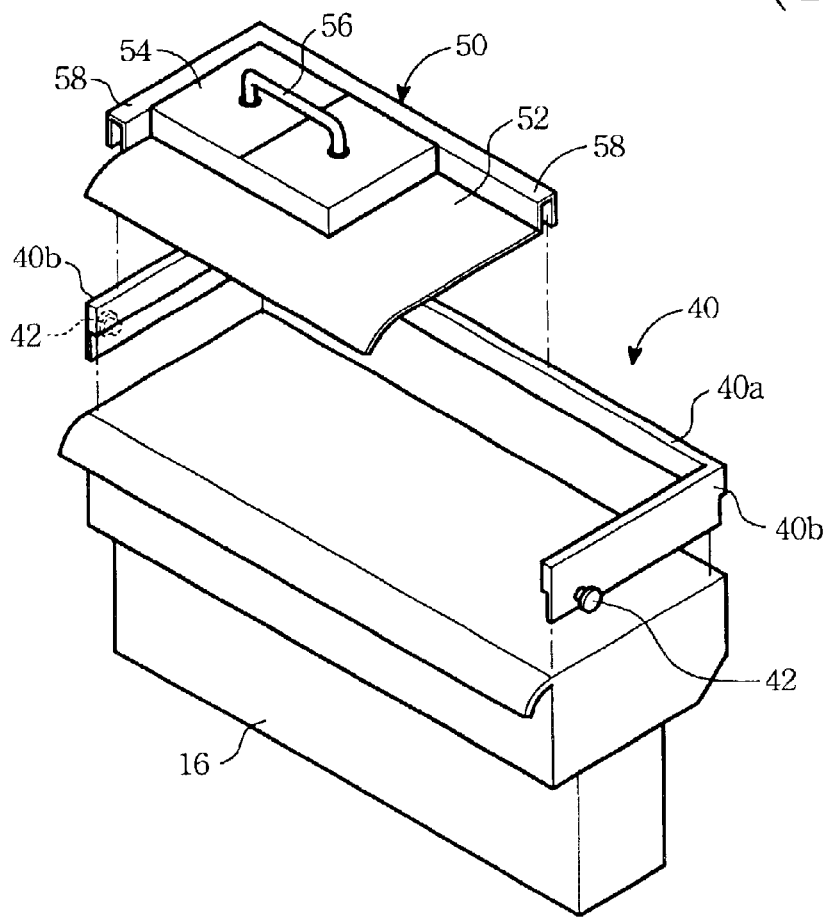
FIG. 4 is a view of the solder bath illustrating the configuration of gland, the block board and the wave former.

Referring to FIG. 4, the apparatus disclosed in the present invention is illustrated. The apparatus is disposed on the wave former for increasing the wave height of the molten solder. The apparatus comprises a block board 40 mounted on the enclosing walls of the wave former 16 for increasing the total height of the enclosing walls. Besides the apparatus also comprises a gland 50 disposed along the inner surfaces of the block board 40 and placed downward on the opening of the wave former 16 to cover the partial opening. The gland 50 is applied to press the molten solder gushed from the opening of the wave former 16 and to have higher solder wave on other partial opening uncovered by the gland 50.

In a preferred embodiment, the block board 40 with a "U" type framework has a long board 40a and two short boards 40b connected individually to two terminals of the long board 40a. When the block board 40 is mounted on the wave former 16, the "U" type framework is closely fastened on the wave former 16 to increase the total height of the enclosing walls of the wave former 16. That means the long board 40a can increase the height of the backplate of the wave former 16; and in the same way the short board 40b can increase the height of the sideplates of the wave former 16. The short boards 40b preferably have screws 42 tighten on outer surfaces thereof for fixing said "U" type block board 40 on the wave former 16.

It is noted that the height of the block board 40 can be adjusted according to practical requirement for controlling the heights of the enclosing walls of the wave former 16. And as shown in FIG. 4, although the long board 40a and short boards 40b having same height are constituted the "U" type block board, but in practical applications the long board 40a and short board 40b can be manufactured with different heights individually to increase heights of the backplate and sideplates for forming higher solder wave and controlling the flow of molten solder in advance.

As to the gland 50 disclosed in this invention further comprises a plank 52 and weight blocks 54 disposed thereon. In a preferred embodiment the weight blocks 54 are jointed with solder onto the plank 52. And mounted on the weight blocks 54 is a handle 56 for operators to hold and move the gland 50. Besides a kit 58 extending from edges of the plank 52 is applied to mount the plank 52 onto the block board 40. Therefore the kit 58 can prevent the molten solder from spilling via connections of the gland 50 and block board 40. In a preferred embodiment the kit 58 as illustrated in FIG. 4 is designed with a "U" type sheet for fixing the plank 52 onto the block board 40.

Figure 1:
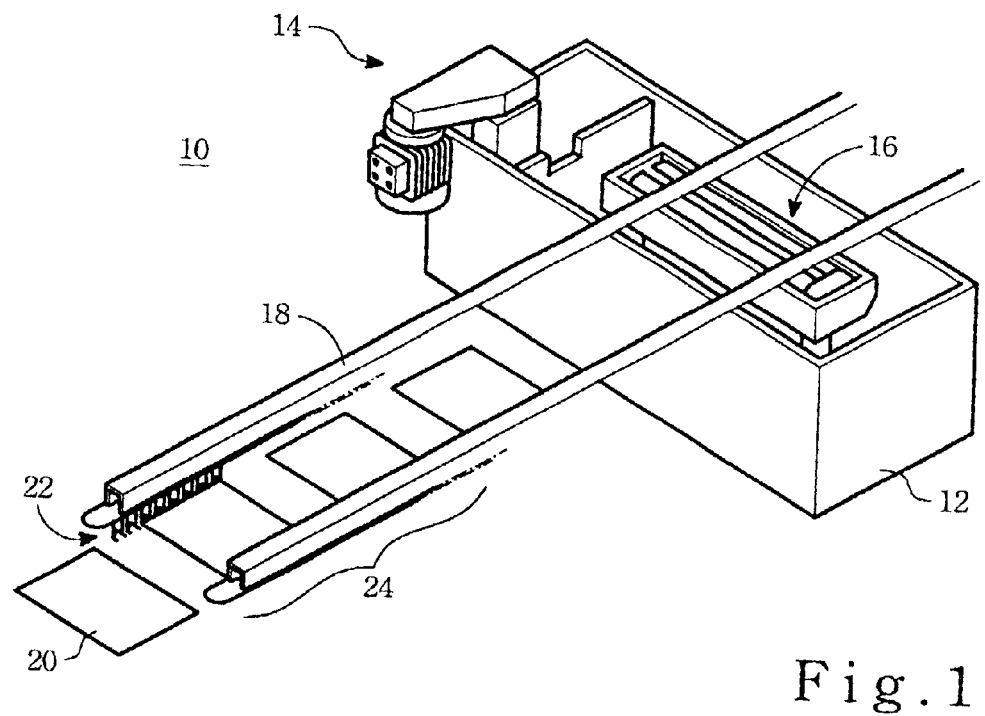
FIG. 1 is a perspective view of the wave soldering system illustrating devices and members for performing the wave soldering process.
Figure 2:
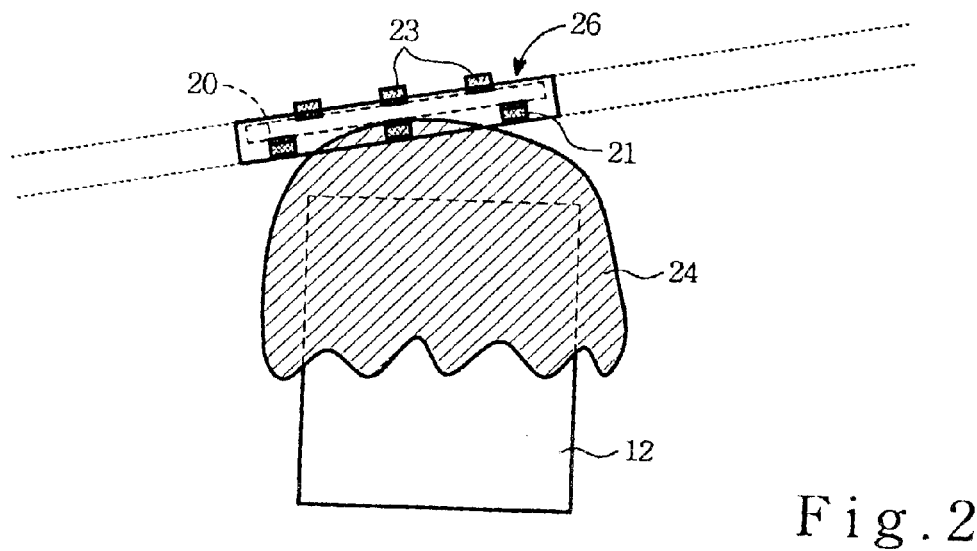
FIG. 2 is a side view of the solder bath illustrating conditions of the carrier with printed circuit board passing the molten solder.
Figure 3:
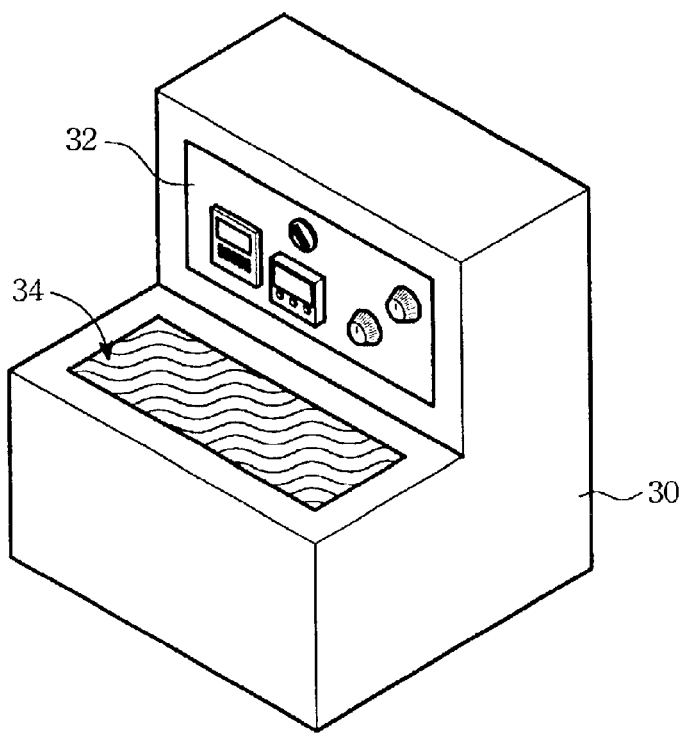
FIG. 3 is a view of the soldering furnace for soldering the printed circuit board.

It is noted that in FIG. 1, in wave soldering procedure only the soldering wave beneath the transport rails 18 can contact with the printed circuit boards for soldering. Namely the solder wave gushed from the partial opening not under the transport rails 18 can not contact with the printed circuit boards. So the plank 52 can be applied to cover the partial opening of the wave former 16. And by disposing the weight blocks 54 on the plank 52 the molten solder in the wave former 16 is pressed to have higher soldering wave. Thus the soldering wave gushed from the uncovered partial opening of the wave former 16 will have higher wave due to the pressure of weight blocks 54.

For instance, the Delta Wave 6622 type of wave soldering system manufactured by Vitronics Soltec Inc. can have highest soldering wave about 12 mm. However after applying the block board 40 and the gland 50, the height of whole molten solder can be increased to 20 mm. Transparently the apparatus provided in the present invention can have higher and more stable soldering wave to perform wave soldering procedures for the printed circuit boards with large thickness or components mounted on both sides thereof.

Besides in the above embodiment the two members of block board 40 and the gland 50 are applied simultaneously to increase height of soldering wave. However these two members can be applied individually for providing higher soldering wave. For example the higher wave can be obtained by only disposing the gland 50 directly on the wave former 16 to cover partial opening of wave former 16. At this moment the kit 58 is mounted directly on the enclosing walls of the wave former 16 to have the plank 52 cover partial opening of the wave former 16. Similarly the weight blocks 54 on the plank 52 can press the beneath molten solder to make the soldering wave become higher.

Besides applying only the gland 50 to press molten solder and increase wave height, the higher wave can be obtained by only applying the "U" type block board 40. The block board 40 can be disposed on top edges of the enclosing walls of the wave former 16 to increase total height of enclosing walls. Thus when the motor pump drives the molten solder to gush from the wave former 16, the height of solder wave will increase due to the molten solder is blocked by the block board 40.

The block board and gland disclosed in the present invention have following advantages:

(1) because the current wave soldering system after introducing the apparatus provided in the present invention can be applied to solder the printed circuit boards with large thickness and components mounted on both sides thereof, there is not necessary to set up the extra soldering furnace in the production lines. Thus the producing procedures are simplified and the cycle times of productions are reduced to effectively promote throughput about 50%.

(2) further, due to the soldering furnace is not necessary for soldering the thick printed circuit boards, the defects like short circuits of soldering points or air pollution can be solved and the manpower cost for operating the soldering furnace can be decreased.

(3) when the apparatus is applied to the wave soldering system, the wave height can be increased to 18 mm with the same rotational rate of the motor pump in conventional processes. So there is no need to increase the rotational rate of motor pump for increasing the height of soldering wave. Thus the turbulence of molten solder can be reduced as much as possible to have stable quality and high yield (about 98%) in performing soldering procedures.

While the preferred embodiment of the invention has been illustrated and described, it will be appreciated that various changes can be made therein without departing from the spirit and scope of the invention.

What is claimed is:

1. A "U" type block board applied to wave soldering systems is mounted on top edges of enclosing walls of a wave former located in a solder bath to increase the height of said enclosing walls of said wave former, whereby the soldering wave height is increased when molten solder contained in said solder bath is driven and gushed from said wave former by a motor pump disposed besides said solder bath, wherein the "U" type block board comprises a long board and two short boards connected individually to two terminals of said long board, and said short boards have screws tighten on outer surfaces thereof for fixing said "U" type block board onto said enclosing walls of said wave former.

2. A gland applied to wave soldering systems is pressed downward along inner surfaces of enclosing walls of a wave former located in a solder bath to cover partial opening of said wave former, wherein said gland includes a plank and weight blocks disposed thereon, for pressing molten solder gushed from said wave former;

whereby the molten solder gushed from other partial opening of said wave former uncovered by said gland have higher solder wave when the molten solder contained in said solder bath is driven by a motor pump besides said solder bath.

3. The gland of claim 2, wherein said weight blocks are jointed with solder onto said plank.

4. The gland of claim 2, wherein said weight blocks have a handle mounted thereon.

5. The gland of claim 2, wherein said plank has a kit extended outwardly from edges thereof for mounting said plank onto said wave former.

6. An apparatus applied to a wave soldering system is disposed onto a wave former for increasing a height of molten solders in a solder bath, said apparatus comprises of:

a block board, mounted along top edges of enclosing walls of said wave former located in said solder bath to increase a solder wave height; and a gland, pressed downward along inner surfaces of said enclosing walls of said wave former for covering partial opening of said wave former to press the molten solder and have higher solder wave on other partial opening of said wave former uncovered by said gland.

7. The apparatus of claim 6, wherein said block board have a long board and two short boards connected individually to two terminals of said long board to have a "U" type structure.

8. The apparatus of claim 7, wherein said short boards have screws tighten on outer surfaces thereof for fixing said "U" type block board onto said enclosing walls of said wave former.

9. The apparatus of claims 6, wherein said gland has a plank and weight blocks jointed thereon with solder.

10. The apparatus of claim 9, wherein said weight blocks have a handle mounted thereon.

11. The apparatus of claim 9, wherein said plank has a kit extended outwardly from edges thereof for mounting said plank onto said wave former.

12. An apparatus applied to a wave soldering system for increasing a height of solder wave, said apparatus comprises of:

a solder bath, for containing molten solder;

a motor pump, disposed besides said solder bath, having fan blades extended into said solder bath for driving said molten solders;

a wave former, disposed in said solder bath, for gushing the molten solder upwardly to form solder wave;

a block board, mounted along top surfaces of enclosing walls of said wave former for increasing the height of said enclosing walls of said wave former; and a gland, pressed downward along inner surfaces of said enclosing walls of said wave former to press the molten solder for increasing the height of said solder wave gushed from partial opening of said wave former uncovered by said gland.

13. The apparatus of claim 12, wherein said block board have a long board and two short boards connected individually to two terminals of said long board to have a "U" type structure.

14. The apparatus of claim 13, wherein said short boards have screws tighten on outer surfaces thereof for fixing said "U" type block board onto said enclosing walls of said wave former.

15. The apparatus of claim 12, wherein said gland has a plank and weight blocks jointed thereon with solder.

16. The apparatus of claim 15, wherein said weight blocks have a handle mounted thereon.

17. The apparatus of claim 15, wherein said plank has a kit extended outwardly from edges thereof for mounting said plank onto said wave former.

* * * * *